May 2, 1967 L. V. BURFORD 3,317,234
CARRIER FOR BOTTLES OR CANS
Filed May 24, 1965 6 Sheets-Sheet 3

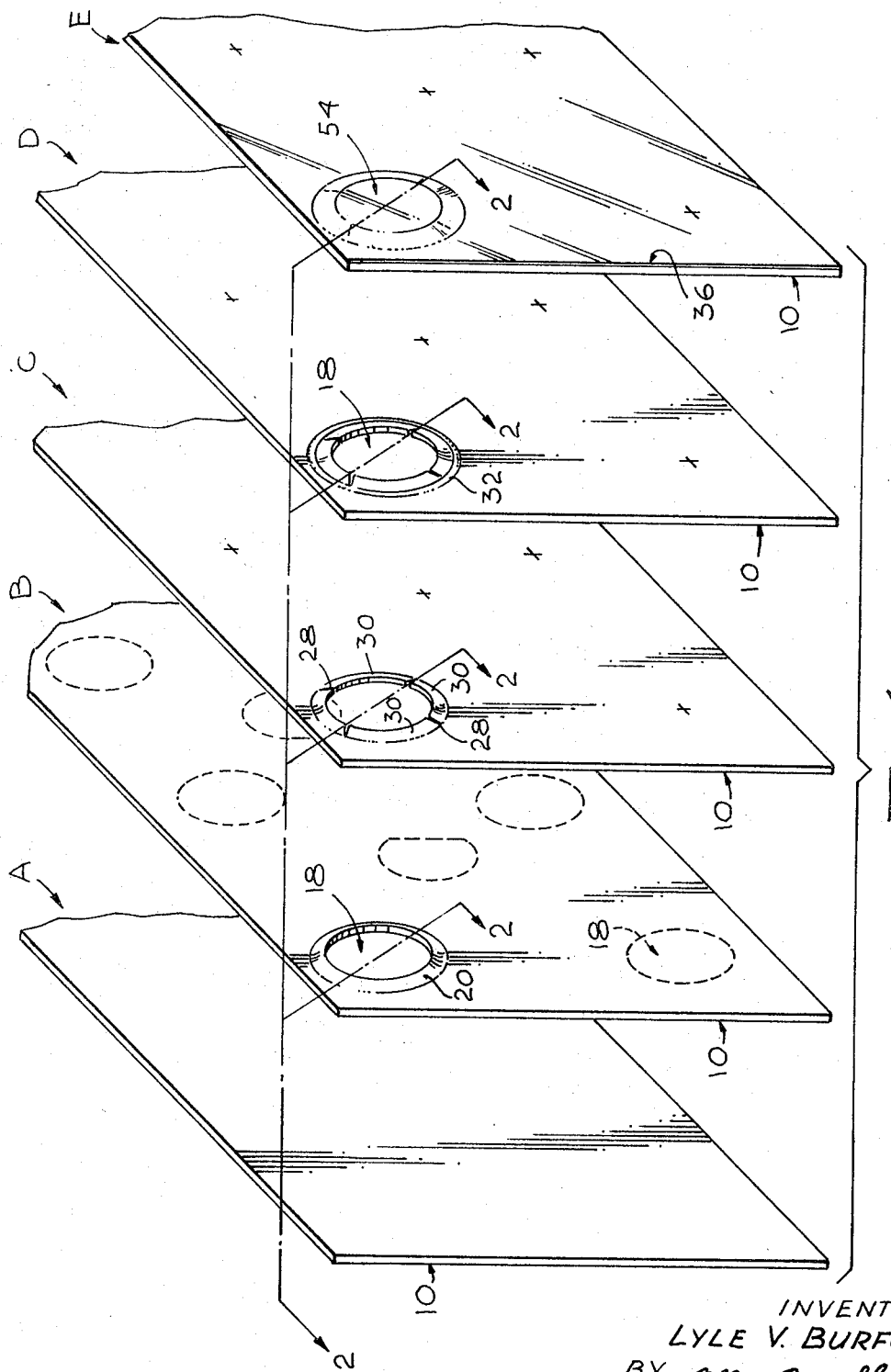

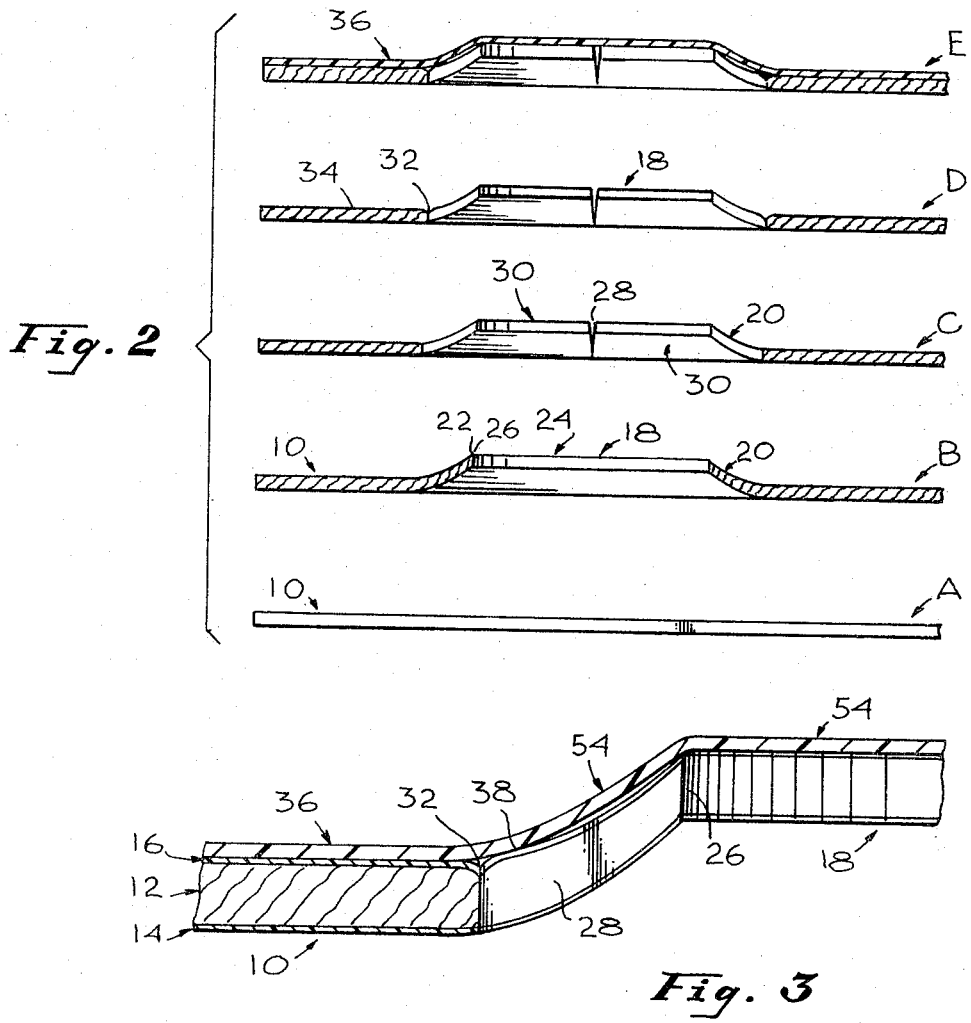
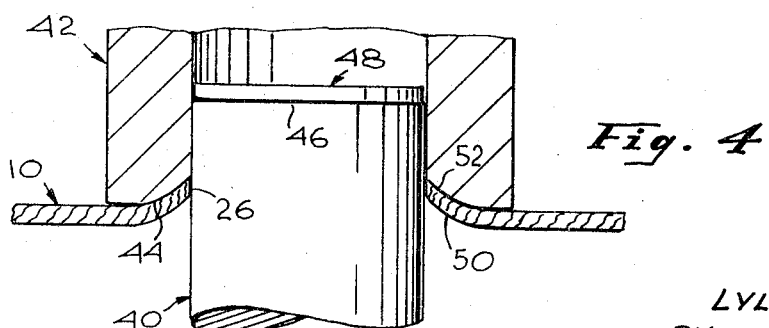

INVENTOR
LYLE V. BURFORD
BY Allan M. Shapiro
ATTORNEY

May 2, 1967

L. V. BURFORD 3,317,234

CARRIER FOR BOTTLES OR CANS

Filed May 24, 1965

INVENTOR
LYLE V. BURFORD
BY Allan M. Shapiro

ATTORNEY

May 2, 1967 L. V. BURFORD 3,317,234
CARRIER FOR BOTTLES OR CANS
Filed May 24, 1965 6 Sheets-Sheet 5

INVENTOR
LYLE V. BURFORD
BY Allan M. Shapiro
ATTORNEY

May 2, 1967
L. V. BURFORD
3,317,234
CARRIER FOR BOTTLES OR CANS
Filed May 24, 1965
Fig. 11
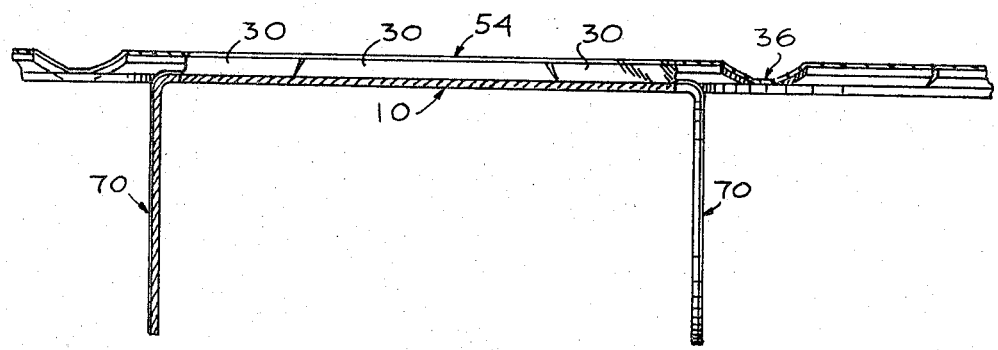
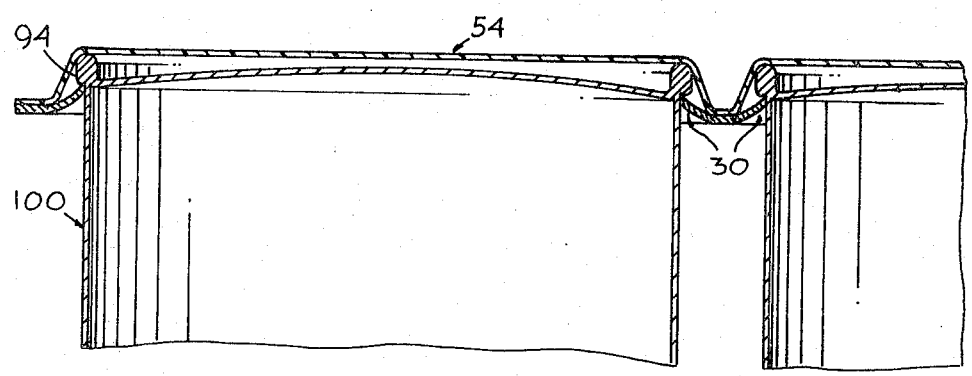
Fig. 12
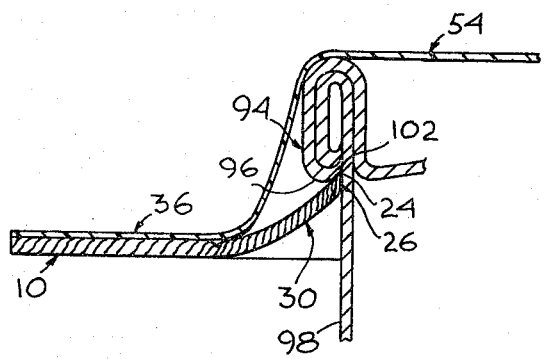
Fig. 13
INVENTOR
LYLE V. BURFORD
BY Allan M. Shapiro
ATTORNEY United States Patent Office 3,317,234
Patented May 2, 1967

3,317,234
CARRIER FOR BOTTLES OR CANS
Lyle V. Burford, Los Angeles, Calif., assignor to James C. De Shazor, Jr., North Hollywood, Calif.
Filed May 24, 1965, Ser. No. 457,929
15 Claims. (Cl. 294—87.2)

The present invention relates to carriers for bottles or cans and, more particularly, to carriers and methods of making carriers for releasably securing together a plurality of bottles or cans to create an effectively unitary group for handling as a single package. For convenience of reference, bottles and cans will be referred to hereinafter generically as "containers" when being discussed commonly, and will be referred to by their specific designations whenever reference thereto is particular.

It is desirable to market goods in containers in multiple-unit packages, and it is a common practice to use paper cartons for this purpose. Paper cartons, however, are relatively expensive to make and to assemble with containers therein. Moreover, paper cartons substantially completely conceal the sides of the containers and the labels appearing thereon so that, for purposes of product recognition, promotion and advertising, additional printing (often of a duplicative nature) must be performed on the cartons at additional expense and of often unsatisfactory nature. Still further, paper cartons are vulnerable to weakening by moisture.

Because of the foregoing disadvantages, various types of sheet metal clips for interconnecting containers have been suggested but, for various reasons, none have been accepted for widespread usage. One serious disadvantage is that sheet metal stampings for this purpose have relatively sharp edges that often cut through the protective coatings of the metal cans and bottle caps and permit subsequent corrosion as well as marring of the labels and general disfigurement of the containers. Another disadvantage is that the sharp edges of a sheet metal clip are exposed when the clip is removed by a purchaser.

Additional attempts to overcome the disadvantages of paper cartons and sheet metal clips include the provision of molded plastic clips having various configurations adapted to engage the peripheral beads of adjacent cans along only an arcuate portion of such beads. However, such clips are relatively expensive, are not usable on bottles, normally require relatively expensive and intricate machinery for assembly of the clips upon the cans, and, due to the relatively close dimensional tolerances required for proper operation of such clips, different clip sizes are required not only for the variations in arcuate curvature of the different sizes of cans but also for variations in the vertical dimensions of the peripheral beads or chimes. Still further, assembly of such clips on cans often requires specific orientation of the cans in the nature of rotation about their vertical axes in order to present a uniform arcuate portion of the peripheral bead and the side of the can so as to avoid the vertical seam in the can. In addition, plastic molded clips are subject to problems arising from expansion and contraction of both the clips and the cans under temperature variations.

Therefore, it is among the objects of the present invention to overcome and/or eliminate the foregoing problems, difficulties and disadvantages of the prior art.

According to the present invention, there is provided a carrier for releasably mounting a plurality of containers of either the can or bottle type in relatively fixed relationship by means of engagement with such containers about either or both of their ends through resilient gripping of the container at the outer circumferential shoulder formed by the usual annular projection in the nature of a bottle cap crimped edge, a bottle's inwardly rounded sides near the bottom end and a can's peripheral bead or chine at either end, such carrier comprising a substantially planar relatively rigid paper stock preferably composed of kraft paper with extremely thin plastic laminations on both surfaces thereof and having a plurality of discrete container-engagement regions, each region preferably having a plurality of circularly arranged radial segments having radially inner edges commonly defining a circular hole having a diameter less than the diameter of that portion of the container to be gripped, and each of such regions preferably being provided with hinge means formed in the paper stock in adjacent encircling relationship to the radial segments preferably by scoring in a manner such as to tend to permit pivotal movement of the radial segments primarily in one direction, i.e., in an axially outward direction relative to the container (herein called the "obverse direction"), the effective diameter of the circular hinge means (and, accordingly, the outer diameter of the radial segments) being greater than the outer diameter of such annular projection of the container whereby one end of the container may be forcibly inserted through a corresponding one of the holes by deflecting the radial segments in such one direction until the annular projection is past the radial segments. Upon completion of such insertion, the radial segments automatically snap back against the side wall of the container and into retention engagement with the annular projection by means of its shoulder, the radial segments and the hinge means of the paper stock having sufficient strength to support the weight of the container during normal handling and transportation of the complete assembly until such time as the desired amount of excessive force is applied to the carrier and container portions of the assembly for desired separation thereof, as by distorting the circular arrangement and relationship of the segments and/or the scoring and/or otherwise applying concentrated stresses in a direction or directions adapted to effect disengagement and removal.

In accordance with the most preferred embodiment of the present invention, there is further provided a plastic film overlaying one surface (herein called the "obverse side") of the paper stock including the holes therein and caused to adhere, as by adhesive but preferably by heat sealing, to all of the paper stock surrounding the container-engagement regions and a portion of the radial segments, such latter portion being effectively circular and constituting a continuous adhesion from the outlying regions and over the hinge means so as to constitute a peripheral ring lock for resiliently maintaining the radial segments in that position wherein the least diameter of the hole is tended to be attained and maintained so that, as the container is inserted through the hole from the reverse side of the carrier, the annular projection of the container forces an accommodating enlargement of the diameter of the hole by resilient deflection of the radial segments in the obverse direction until passage of the annular projection permits the radial segments to return to form the last diameter hole attainable with respect to engagement about the sides of the container. In such preferred embodiment, insertion of the container end through the hole causes forced abutment engagement of the container end with the plastic film overlaying the hole for resilient stretching of such film portion whereby the radially inward edges of the radial segments are resiliently biased in the substantially obverse direction into gripping engagement with the outer circumferential shoulder of the container's annular projection. A most important and improved feature resides in the completely covering relationship of the plastic film with respect to the end of the container whereby a seal of practically hermetic effectiveness is accomplished for continuous and ultimate protection and cleanliness of the container end until removal of the container from the carrier for immediately available use by the consumer, a condition not attainable by any commercially feasible device of the prior art. Still further, the plastic film sheet of the preferred embodiment of the present invention is sufficiently thin to permit a condition known in the art as a high MVT rate ("MVT" being the common abbreviation for "moisture vapor transmission"), such condition being essential for sufficient moisture to pass through the thin film to prevent mold from forming on the container top, particularly when containing malt beverages such as beer.

The features of the present invention which are believed to be novel are set forth with particularity in the appended claims. The present invention, both as to its organization and manner of operation, together with further objects and advantages thereof, may best be understood by reference to the following description of a preferred embodiment, taken in connection with the accompanying drawings, in which:

FIGURE 1 is a series of fragmentary perspective views showing a preferred sequence of stages A, B, C, D and E for manufacture of a container carrier in accordance with a preferred embodiment of the present invention;

FIGURE 2 is a series of fragmentary enlarged transverse sectional views, partly in elevation, as seen commonly along line 2—2 in FIGURE 1;

FIGURE 3 is an enlarged view, similar in aspect to FIGURE 2, showing the details of construction at the final stage E;

FIGURE 4 is an enlarged transverse sectional view of the carrier and hole cutting dies for cutting the holes in a preferred manner at stage B in FIGURES 1 and 2;

FIGURE 11 is an enlarged fragmentary transverse sectional view, partly in elevation, as seen substantially along line 11—11 in FIGURE 9, showing the carrier prior to assembly with the can containers;

FIGURE 12 is an enlarged fragmentary transverse sectional view as seen along line 12—12 in FIGURE 10, showing the carrier engaged with a can container; and FIGURE 13 is a further enlarged fragmentary view similar in aspect to FIGURE 12.

Figure 5:
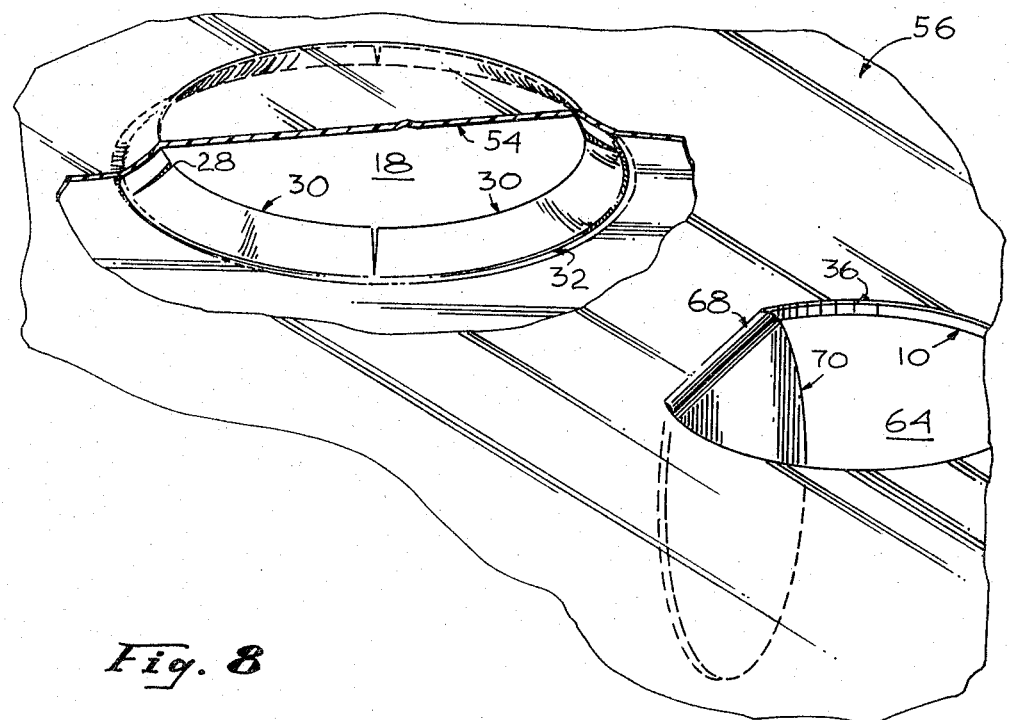
FIGURE 5 is an enlarged fragmentary perspective view, with the plastic film sheet partly broken away, of the carrier in accordance with the present invention adapted for interconnecting a plurality of bottles or cans.

In the drawings, various proportions, dimensions and relationships have been exaggerated for the sake of clarity and convenience of illustration and description.

Referring to FIGURES 1, 2 and 3, the letters A to E inclusive designate a preferred embodiment of a carrier member in successive stages of manufacture by means of a preferred process in accordance with the present invention. Indicated generally at A is a sheet 10 of paper stock which, in FIGURES 1 and 2 as well as all of the other figures of the drawings other than FIGURE 3, is shown as of uniform integral construction for convenience and clarity of illustration as a single member but which, in FIGURE 3, is illustrated (in exaggerated proportions) as consisting of a laminated structure of a sheet 12 of paperboard surfaced by a pair of laminate films 14 and 16 preferably composed of plastic material such as polyethylene. As used herein, the term "paper stock" is used to refer to the integral sheet structure 10 of the combined sheet 12 of paperboard with its pair of laminate films 14 and 16. As exemplary dimensions, the paperboard sheet may be about 0.020 inch thick and the laminate films 14 and 16 may be each about 0.001 inch thick.

At B, the paper stock 10 is provided with a plurality of predeterminedly spaced holes 18 in the container-engagement regions preferably formed through the paper stock 10 by means of die cutting wherein the cut is performed in a novel manner such as is hereinafter described in connection with FIGURE 4 so as to provide an upwardly radiused deflection or initial pre-set condition of the circumferential portion 20 of the paper stock 10 defining the hole 18 so as to have a relatively acute angle or point 22 (as seen in section) for the upper annular edge extremity 24 of the radially inward edge 26 of the circumferential portion 20.

At the next stage indicated at C, the circumferential portion 20 is provided with a plurality of radial slits 28 therethrough whereby the circumferential portion 20 is divided into a corresponding plurality of radial segments 30 which are relatively independent of each other for various operations and functions of either separate or identical nature in accordance with purposes and functions as will become clearer later.

At the stage indicated at D, the paper stock 10 is provided with a circular hinge ring 32 adjacent to the radial segments 30 and peripherally thereabout, with the radial slits 28 terminating at the hinge ring 32. The hinge ring 32 is formed by a process generally known as "scoring," the illustrated preferred indentation on the obverse side 34 of the paper stock 10 resulting from an indenting type of such scoring process.

At the next stage indicated at E, a sheet 36 of flexible and resilient plastic having a low stretch modulus of elasticity is disposed upon the paper stock 10 so as to overlay the entire upper surface or obverse side 34 thereof, including the holes 18 so as to cover such holes, and is bonded onto substantially the entire paper stock 10 with the exception of the radial segments 30, no bonding occurring between the plastic sheet 36 and the radial segments 30 on all but an initial minor circumferential portion 38 thereof extending radially inwardly from the hinge ring 32 approximately 0.010 inch. Although other bonding means may be employed, a heat sealing process is preferred for reasons which will become clear hereafter.

Referring to FIGURE 4, a preferred method of die cutting the holes 18 is illustrated wherein a circular male die 40 progresses through the paper stock 10 and into a cylindrical female die 42, the receiving shoulder 44 of the female die 42 being radiused whereby the initial contact of the face 46 of the male die 40 upon the paper stock 10 causes deflection of the paper stock against the shoulder 44 prior to circularly sliced separation of the cut-out portion 48 from the paper stock 10. Thus, as the slicing occurs, the upper annular extremity 24 (as seen in FIGURE 2) of the radially inner edge 26 attains an acute angle or point 22. While in engagement with the dies 40 and 42, the radially inward edge 26 is vertical, as illustrated; however, upon removal of the paper stock 10 from the dies 40 and 42, the tensioned convex surface portion 50 and the compressed concave surface portion 52 cause the circumferential portion 20 to tend to return slightly toward the previous planar configuration but not entirely so, thereby resulting in the inner edge surface 26 having a truncated cone configuration with the imaginary apex of the cone residing in the obverse direction whereby the edge surface 26 is sloped to converge upwardly and, conversely, diverge downwardly for providing a leading or receiving angle for insertion reception of the container end during automatic assembly operations.

An additionally novel, unobvious and important aspect of the present invention relates to the physical structure, effects and functions of the plastic sheet 36 with regard to itself as well as its cooperative relationship with the paper stock 10. Preferably, the plastic sheet 36 consists of a film of polyethylene or similar plastic material having a thickness in the approximate order of 0.001 inch. In the normal process of manufacture of thin polyethylene films, the film is stretched so that its planar dimensions are increased uniformly in all directions, resulting in a film that is thinner than the original film prior to such stretching. While such resultant film is flexible and normally does not "recall" its previous structure and dimensions under physical stresses, polyethylene belongs to a class of thermoplastic materials which have a "memory" (i.e., tend to "recall" or return to their original shape, configuration and dimensions) when subjected to the application of external heat of a sufficient degree, theoretically, to release or relieve the molecular stresses and strains occasioned by the prior physical stretching. It is believed that, in effect, the application of heat extends the prior elastic limit so that the stretched material is capable of restoring itself to its initial state. Of course, the degree of such heat must be less than an amount which would cause destruction of the molecular bonds and the material itself.

In accordance with the preferred aspects of the present invention, the sheet 36 of such plastic memory type of material is heat sealed to the previously described selected areas of the paper stock 10 by any of the well known methods and apparatus (not shown) for heat sealing and preferably by the direct conduction of heat applied to such areas. In so doing, it will be appreciated that the heat sealing apparatus radiates heat to the generally surrounding and adjacent regions and, accordingly, since the heat seal is applied substantially simultaneously or, at least, continuously to substantially all of the regions of the paper stock 10 surrounding the holes 18, heat is radiated onto that portion 54 of the plastic sheet 36 overlying the holes 18 as well as the circumferential portion of the plastic sheet 36 overlaying but not being contact sealed to the circumferential portion 20 of the paper stock 10. Thus, heat radiation upon the non-sealed portion 54 of the plastic film sheet achieves the previously described effect on such non-sealed portion of permitting it to exercise its memory whereby it tends to return to its previous planar dimensions and, most importantly, reacquires that previously high degree of elasticity which is characteristic of such a film prior to the aforesaid stretched formation. As a consequence, the non-sealed portion 54 of the plastic film sheet 36, being bonded at its circular perimeter to the minor circumferential portion 38 of the radial segments 30 adjacent to the hinge ring 32, achieves a stretched elastic structure similar to that of a drumhead. The functions and effects of the stretched elastic portion 54 of the plastic film sheet 36 will become more apparent in connection with the description of the assembly and operation of the carrier relative to the containers.

Figure 8:
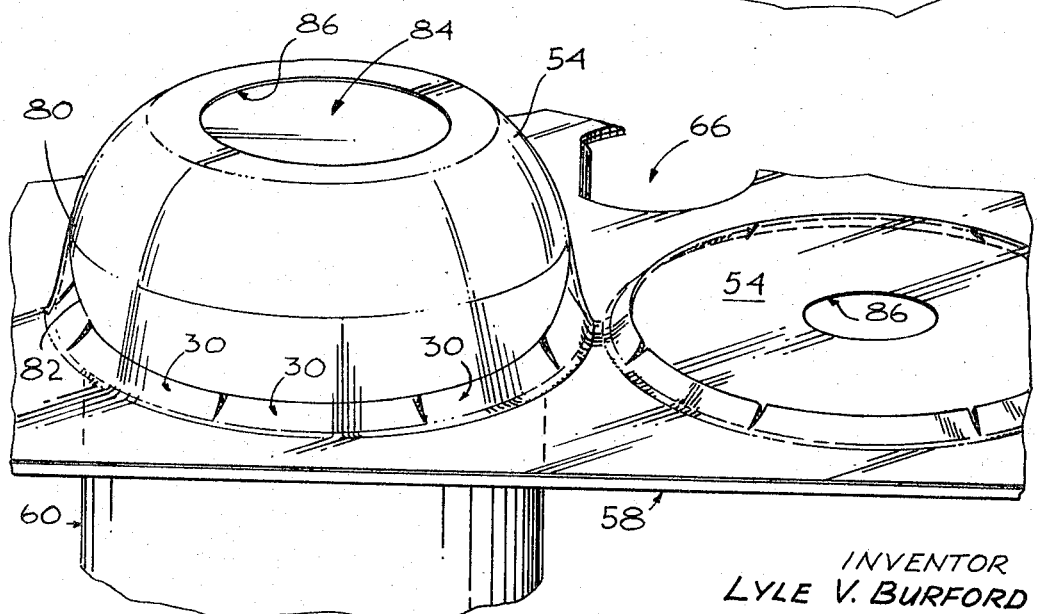
FIGURE 8 is a fragmentary enlarged bottom perspective view of the bottom member of the bottle carrier illustrated in FIGURE 7, as seen substantially along line 8—8 therein, showing one of the engaging portions cooperatively engaged with the bottom of a bottle and another of such portions prior to such engagement.
Figure 6:
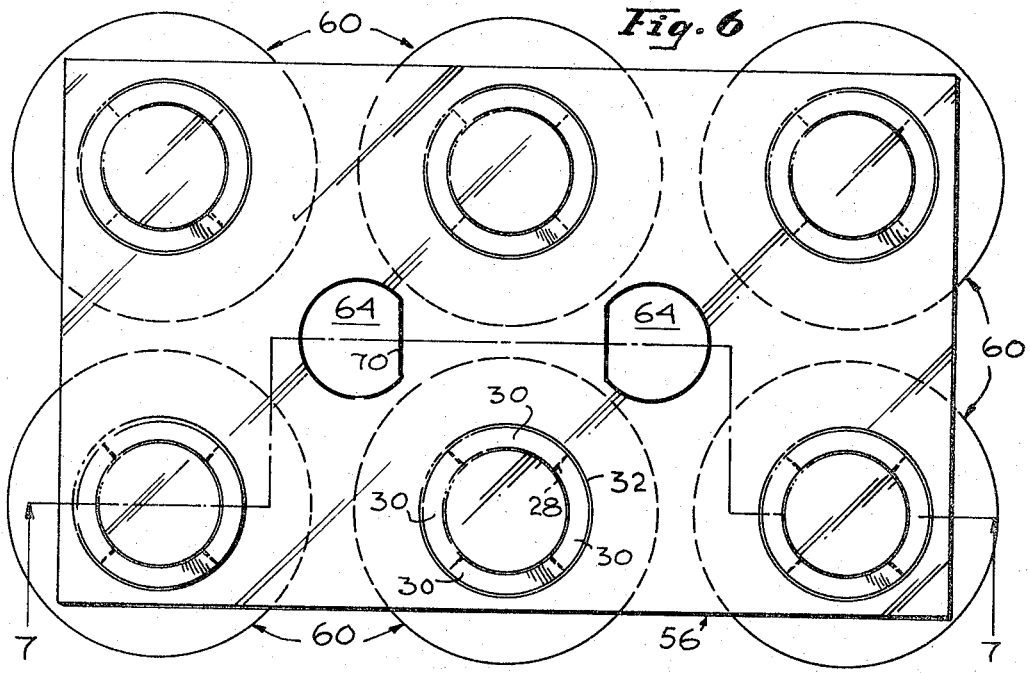
FIGURE 6 is a top plan view of a group of six bottles engaged and interconnected at their tops by the carrier in accordance with the present invention.
Figure 7:
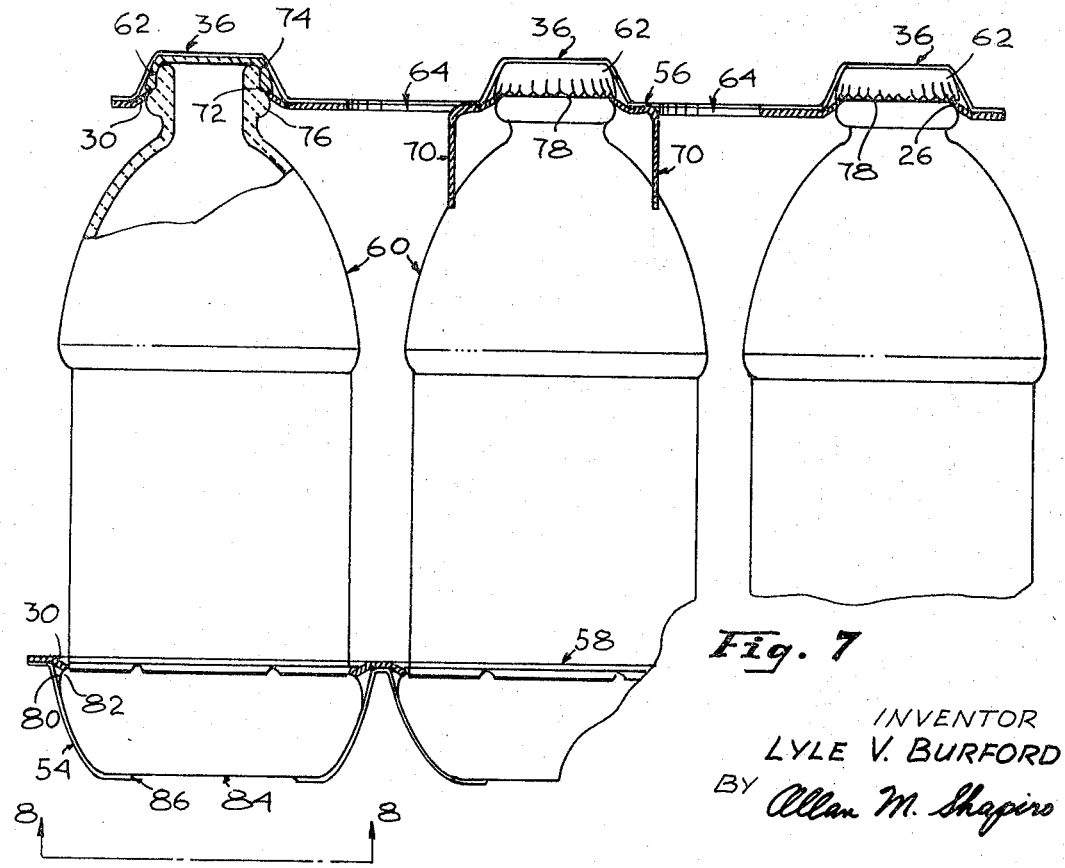
FIGURE 7 is a transverse sectional view, partly in elevation, taken along the line 7—7 in FIGURE 6 and showing both top and bottom carriers in interconnected engagement with the bottles.

Referring to FIGURES 5–8 wherein a carrier for bottles is disclosed in accordance with a preferred embodiment of the present invention, there is seen an upper carrier 56 and a lower carrier 58 in combined carrier relationship to a plurality of bottles 60 each having a crown cap 62 of the common and usual type. The members 56 and 58 preferably are manufactured in accordance with the previously described process and are separately designated for convenience of reference and notation of variations hereinafter described. However, the same reference numerals are used in the drawings to refer to the same or similar elements previously described although not specifically mentioned in the following description. The upper and lower carriers 56 and 58 preferably are provided with a respective pair of finger holes 64 and 66 as by punching a major circular hole in the paper stock 10 and the plastic film sheet 36, leaving a chord hinge portion 68 whereby the partially cut-out portion 70 can be bent inwardly to provide finger access through the holes 64 and 66 for manual carrying of the assembly.

Referring to the upper carrier 56, the hole 18 defined by the radial segments 30 has a least possible diameter less than the outer diameter of the annular groove 72 defined between the peripheral beads or projections 74 and 76 on the usual bottle crown. The hinge ring 32 has an effective diameter greater than the greatest outer diameter of the crown cap 62, normally being defined by the crimped edge 78 of the crown cap 62 In assembling the upper carrier member 56 upon the bottles 60, engagement force is applied to the bottles 60 and the upper carrier 56 relative to each other for insertion of the crown cap 62 through the hole 18 from the reverse side. As the cap 62 progresses through the hole 18, the radial segments 30 are displaced in the obverse direction upwardly and radially outwardly, as they pivot about the hinge ring 32, to permit insertion of the cap 62 entirely through the hole 18.

As the cap 62 commences its entry through the hole 18, it encounters the plastic film sheet 36 and, as insertion continues, the plastic film sheet 36 is forced ahead of the cap 62 and, in so doing, becomes stretched so as to provide both a protective covering for the top of the bottle 60 and, at least equally importantly, a retention spring action for the paper stock 10 due to the elastic stress created in the plastic sheet 36, the amount of tensional strain imparted to the plastic sheet 36 being preferably within the elastic limit of the plastic material. As the cap 62 completes its insertion through the hole 18 and past the circumferential radial segments 30, such segments effectively snap past the cap edge 78 until the radially inward edge 26 of the radial segments 30 contacts the side wall of the bottle crown and, in such posiiton, the upper surfaces of the radial segments 30 abuttingly engage the downwardly directed shoulder or underside of the cap 62 in withdrawal prevention relationship thereto, with the upper edge extremity 24 effectively captured withi the annular recess defined by the bottle crown side wall and the cap 62.

The above described operation of assembly is identical with respect to the lower carrier 58, with the exceptions of application hereinafter noted. Due to physical and structural requirements relative to the bottle 60 with which this invention is not concerned, bottles normally are provided with peripheral beads or projections 80 near their bottoms, and such projections provide an upwardly facing shoulder 82 for engagement by the radial segments 30 in substantially the same manner as previously described in connection with the crimped edge 78 of the bottle cap 62. Due to the normally excessive vertical distance between the bottom surface 84 of the bottle 60 and the shoulder 82, and also due to the relative absence of need for a completely protective cover, the plastic film sheet 36 is provided with a concentric hole 86 in the non-sealed portion 54 so that such portion 54 may stretch to accommodate the bottom end of the bottle 60 without exceeding its elastic limit; of course, the hole 86 becomes enlarged during assembly. Although the bottom carrier member 58 is not essential for many purposes, it is highly desirable for purposes of preventing rattling and other effects occasioned by otherwise unrestrained lateral movement of the bottles at their bottom ends.

Figure 9:
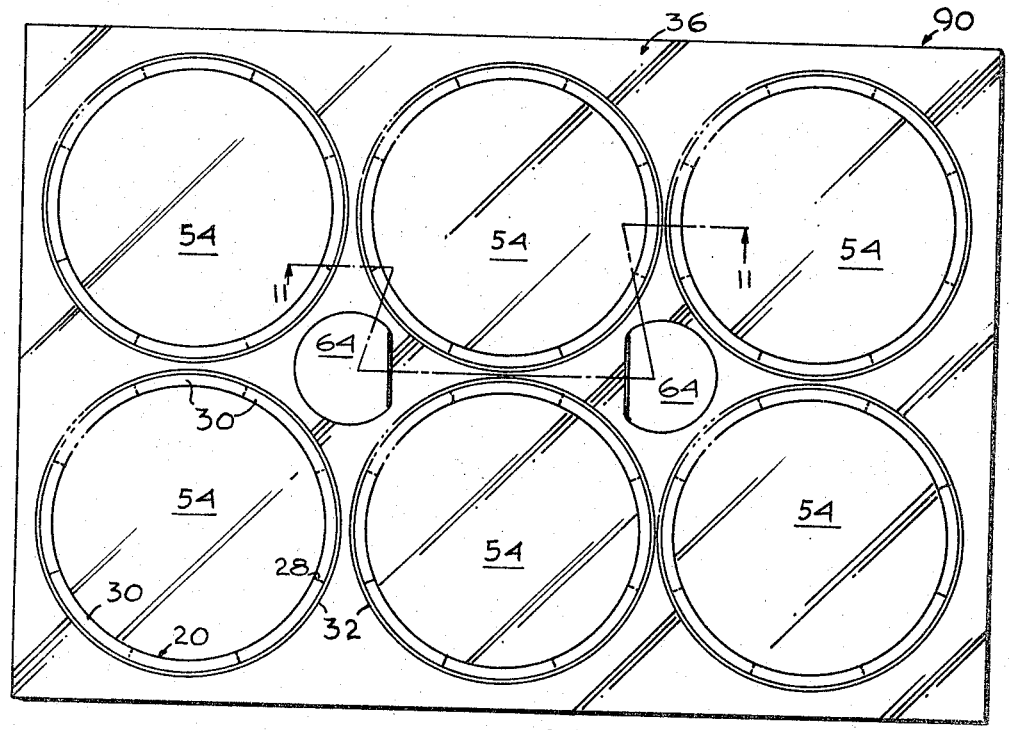
FIGURE 9 is a top plan view of a can carrier in accordance with the present invention for engagement with a group of six cans.
Figure 10:
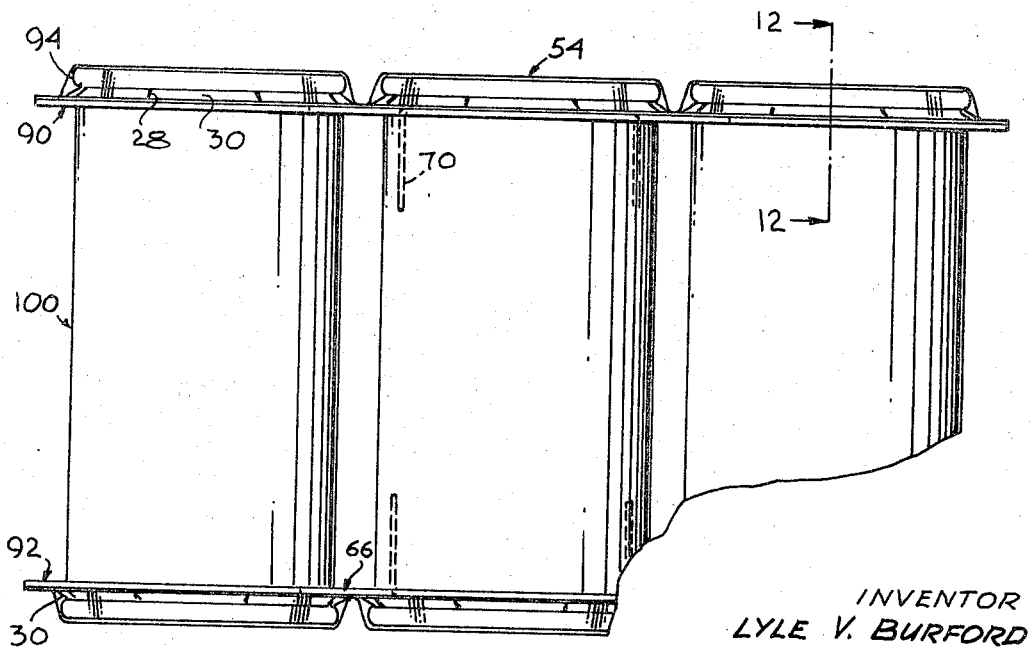
FIGURE 10 is a side elevational view of the carrier of FIGURE 9, one each thereof being in assembled engagement with the top and bottom ends of a plurality of cans.

Referring to FIGURES 9–13 wherein is illustrated the application of the carrier to the can type of container, the respective upper and lower carriers 90 and 92 normally are identical to each other in structure and assembly and preferably manufactured in accordance with the previously described process. Because of their identity, only one carrier 90 will be described. Upon insertion of the peripheral bead or projection 94 past the radial segments 30 of the circumferential portion 20, the radial segments 30 snap past the downwardly facing shoulder 96 of the peripheral bead 94, and the radially inward edge 26 of the segments 30 contacts the side wall 98 of the can 100. In accordance with the preferred embodiment of the present invention, the acutely pointed upper edge extremity 24 is received within the annular pocket 102 defined between the shoulder portion 96 of the peripheral bead 94 and the side wall 98 of the can, thereby assuring greater security of retention. The elastic stress residing in the non-sealed portion 54 of the plastic sheet 36 urges the radial segments 30 in the obverse direction upwardly and inwardly relative to the peripheral shoulder 96 and the can side 98 for maintaining the carrier member 90 and the can 100 in withdrawal prevention relationship until the imposition of desired withdrawal forces in excess of those forces normally encountered during handling and transportation of the complete assembly.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A carrier for releasably mounting a plurality of containers in relatively fixed relationship, each of such containers having at either end an annular projection forming an outer circumferential shoulder, comprising:
   a substantially planar paper stock with obverse and reverse sides and having a corresponding plurality of discrete container-engagement regions each comprising a circumferential portion radially defining a circular hole having a diameter less than the outer diameter of such projection; and
   a plastic film sheet bonded onto the obverse side of said paper stock in substantially completely covering relationship thereto and overlaying such holes, whereby one end of each of such containers may be forcibly inserted through a corresponding one of said holes from the reverse side into resilient engagement with said plastic film sheet for elastic stretching thereof and so that said annular projection is past said circumferential portion, said circumferential portion having being deflected by such annular projection during such insertion and, upon completion of such insertion, automatically snapped against the side of the container and into retention engagement with the shoulder of such annular projection said plastic film sheet acting to resiliently maintain such retention engagement.

2. A carrier in accordance with claim 1 wherein said plastic film sheet is heat sealed to said paper stock at all but a major portion of said circumferential portion adjacently surrounding said hole and has a non-sealed portion overlaying each of said holes.

3. A carrier in accordance with claim 2 wherein said plastic film sheet is composed of a plastic memory material that has been pre-stretched beyond its initial elastic limit, such heat sealing causing radiant heating of said non-sealed portion of said plastic sheet for effecting return of such initial elasticity in said non-sealed portion.

4. A carrier for releasably mounting a plurality of containers in relatively fixed relationship, each of such containers having at either end an annular projection forming an outer circumferential shoulder, comprising:
   a substantially planar paper stock with obverse and reverse sides and having a corresponding plurality of discrete container-engagement regions each comprising a circumferential portion radially defining a circular hole having a diameter less than the outer diameter of such projection;
   a plastic film sheet bonded onto the obverse side of said paper stock in substantially completely covering relationship thereto and overlaying such holes; and
   hinge means formed in said paper stock in each of said regions comprising a peripheral hinge ring adjacent encircling relationship to said circumferential portion for tending to permit pivotal movement of said circumferential portion primarily in the obverse direction, the effective diameter of said peripheral hinge ring being greater than the outer diameter of such projection, whereby one end of each of said containers may be forcibly inserted through a corresponding one of said holes from the reverse side into resilient engagement with said plastic film sheet and so that said annular projection is past said circumferential portion, said circumferential portion being deflected by such annular projection during such insertion and, upon completion of such insertion, automatically snapped against the side of the container and into retention engagement with the shoulder of such annular projection.

5. A carrier in accordance with claim 4 wherein said plastic film sheet is heat sealed to said paper stock at all but a major portion of said circumferential portion adjacently surrounding said hole and has a non-sealed portion overlaying each of said holes.

6. A carrier in accordance with claim 5 wherein said plastic film sheet is composed of a plastic memory material that has been pre-stretched beyond its initial elastic limit, such heat sealing causing radiant heating of said non-sealed portion of said plastic sheet for effecting return of such initial elasticity in said non-sealed portion.

7. A carrier for releasably mounting a plurality of containers in relatively fixed relationship, each of such containers having at either end an annular projection forming an outer circumferential shoulder, comprising:
   a substantially planar paper stock with obverse and reverse sides and having a corresponding plurality of discrete container-engagement regions each comprising a circumferential portion radially defining a circular hole having a diameter less than the outer diameter of such projection;
   a plastic film sheet bonded onto the obverse side of said paper stock in substantially completely covering relationship thereto and overlaying such holes; and
   hinge means formed in said paper stock in each of said regions comprising a peripheral hinge ring in adjacent encircling relationship to said circumferential portion for tending to permit pivotal movement of said circumferential portion primarily in the obverse direction, the effective diameter of said peripheral hinge ring being greater than the outer diameter of such projection, whereby one end of each of such containers may be forcibly inserted through a corresponding one of said holes from the reverse side into resilient engagement with said plastic film sheet for elastic stretching thereof and so that said annular projection is past said circumferential portion, said circumferential portion being deflected by such annular projection during such insertion and, upon completion of such insertion, automatically snapped against the side of the container and into retention engagement with the shoulder of such annular projection, said plastic film sheet acting to resiliently maintain such retention engagement.

8. A carrier in accordance with claim 7 wherein said plastic film sheet is heat sealed to said paper stock at all but a major portion of said circumferential portion adjacently surrounding said hole and has a non-sealed portion overlaying each of said holes.

9. A carrier in accordance with claim 8 wherein said plastic film sheet is composed of a plastic memory material that has been pre-stretched beyond its initial elastic limit, such heat sealing causing radiant heating of said non-sealed portion of said plastic sheet for effecting return of such initial elasticity in said non-sealed portion.

10. A carrier for releasably mounting a plurality of containers in relatively fixed relationship, each of such containers having at either end an annular projection forming an outer circumferential shoulder, comprising:
  a substantially planar paper stock with obverse and reverse sides and having a corresponding plurality of discrete container-engagement regions each comprising a plurality of circumferentially arranged radial segments having radially inner edges commonly defining a circular hole having a diameter less than the outer diameter of such projection;
  a plastic film sheet bonded onto the obverse side of said paper stock in substantially completely covering relationship thereto and overlaying such holes; and
  hinge means formed in said paper stock in each of said regions comprising a peripheral hinge ring in adjacent encircling relationship to said radial segments for tending to permit pivotal movement of said radial segments primarily in the obverse direction, the effective diameter of said peripheral hinge ring being greater than the outer diameter of such projection;
  whereby one end of each of such containers may be forcibly inserted through a corresponding one of said holes from the reverse side into resilient engagement with said plastic film sheet for elastic stretching thereof and so that said annular projection is past said radial segments, said radial segments being pivotally deflected by such annular projection during such insertion and, upon completion of such insertion, automatically snapped against the side of the container and into retention engagement with the shoulder of such annular projection, said plastic film sheet acting to resiliently maintain such retention engagement.

11. A carrier in accordance with claim 10 wherein said plastic film sheet is heat sealed to said paper stock at all but a major portion of said radial segments adjacently surrounding said hole and has a non-sealed portion overlaying each of said holes.

12. A carrier in accordance with claim 11 wherein said plastic film sheet is composed of a plastic memory material that has been pre-stretched beyond its initial elastic limit, such heat sealing causing radiant heating of said non-sealed portion of said plastic sheet for effecting return of such initial elasticity in said non-sealed portion.

13. A carrier for releasably mounting a plurality of containers in relatively fixed relationship, each of such containers having at either end an annular projection forming an outer circumferential shoulder, comprising:
  a substantially planar paper stock with obverse and reverse sides and having a corresponding plurality of discrete container-engagement regions each comprising a plurality of circumferentially arranged radial segments having radially inner edges commonly defining a circular hole having a diameter less than the outer diameter of such container projection, each of said radially inner edges having an acutely pointed obverse edge extremity;
  a plastic film sheet bonded onto the obverse side of said paper stock in substantially completely covering relationship thereto and overlaying such holes; and
  hinge means formed in said paper stock in each of said regions comprising a peripheral hinge ring in adjacent encircling relationship to said radial segments for tending to permit pivotal movement of said radial segments primarily in the obverse direction, the effective diameter of said peripheral hinge ring being greater than the outer diameter of such container projection;
  whereby one end of each of such containers may be forcibly inserted through a corresponding one of said holes from the reverse side into resilient engagement with said plastic film sheet for elastic stretching thereof and so that said annular projection is past said radial segments, said radial segments being pivotally deflected by such annular projection during such insertion and, upon completion of such insertion, automatically snapped against the side of the container and into retention engagement with the shoulder of such annular projection, said plastic film sheet acting to resiliently maintain such retention engagement, said obverse edge extremities being effectively captured between said container side and said annular projection shoulder.

14. A carrier in accordance with claim 13 wherein said plastic film sheet is heat sealed to said paper stock at all but a major portion of said radial segments adjacently surrounding said hole and has a non-sealed portion overlaying each of said holes.

15. A carrier in accordance with claim 14 wherein said plastic film sheet is composed of a plastic memory material that has been pre-stretched beyond its initial elastic limit, such heat sealing causing radiant heating of said non-sealed portion of said plastic sheet for effecting return for such initial elasticity in said non-sealed portion.

References Cited by the Examiner

UNITED STATES PATENTS 3,200,944    8/1965    Rapata.

GERALD M. FORLENZA, *Primary Examiner.*

G. F. ABRAHAM, *Assistant Examiner.*